(12) United States Patent
Xu

(10) Patent No.: US 9,067,481 B2
(45) Date of Patent: Jun. 30, 2015

(54) COMPARTMENT COVER SYSTEM FOR COVERING COMPARTMENT OF PICKUP TRUCK

(71) Applicant: Cixi City Liyuan Auto Parts Co., Ltd., Cixi (CN)

(72) Inventor: Enli Xu, Cixi (CN)

(73) Assignee: CIXI CITY LIYUAN AUTO PARTS CO., LTD., Cixi (CN)

(*) Notice: Subject to any disclaimer, the term of this patent is extended or adjusted under 35 U.S.C. 154(b) by 0 days.

(21) Appl. No.: 13/809,366

(22) PCT Filed: Nov. 2, 2012

(86) PCT No.: PCT/CN2012/084029
§ 371 (c)(1),
(2) Date: Jan. 9, 2013

(87) PCT Pub. No.: WO2014/015574
PCT Pub. Date: Jan. 30, 2014

(65) Prior Publication Data
US 2015/0069780 A1 Mar. 12, 2015

(30) Foreign Application Priority Data
Jul. 21, 2012 (CN) .......................... 2012 1 0252949

(51) Int. Cl.
B60J 7/16 (2006.01)
(52) U.S. Cl.
CPC ...................... B60J 7/1607 (2013.01)
(58) Field of Classification Search
CPC ...................... B60P 7/02; B60P 7/04
USPC ...................................................... 296/100.18
See application file for complete search history.

(56) References Cited

U.S. PATENT DOCUMENTS 3,482,343 A * 12/1969 Hamu .......................... 38/102.5
5,076,338 A * 12/1991 Schmeichel et al. ........ 160/368.1
(Continued)

FOREIGN PATENT DOCUMENTS

CN 201125589 Y * 10/2008
CN 201395993 Y * 2/2010
(Continued)

OTHER PUBLICATIONS

Search report for PCT/CN2012/084029, Feb. 11, 2012.*
(Continued)

Primary Examiner — Hilary Gutman
(74) Attorney, Agent, or Firm — Kilpatrick Townsend & Stockton LLP

(57) ABSTRACT

A pickup compartment cover system having a covering layer with a front and a back frame edge. Both a driver and a passenger side include a frame edge fixed at the head of the frame edge, a buckle having a slot with an inward opening, a lock casing on an end of the back frame edge having a lock tongue cavity with an outward opening; a lock tongue provided inside the tongue cavity at the tail with a pulling rod section passing backward through the casing, and a compression spring surrounding the pulling rod section inside the lock tongue cavity pushed on one end against the lock tongue and on the other end against a tip of the lock tongue cavity so the lock tongue protrudes outside of the opening and the opening can further be locked into the slot. The two pulling rod sections connect through a pulling cord.

9 Claims, 9 Drawing Sheets

(56) References Cited

U.S. PATENT DOCUMENTS

| | | | |
|---|---|---|---|
| 5,472,256 A * | 12/1995 | Tucker | 296/100.18 |
| 5,758,922 A * | 6/1998 | Wheatley | 296/100.15 |
| 5,860,691 A * | 1/1999 | Thomsen et al. | 296/100.18 |
| 6,543,835 B2 | 4/2003 | Schmeichel et al. | |
| 6,619,719 B1 * | 9/2003 | Wheatley | 296/100.15 |
| 6,752,449 B1 * | 6/2004 | Wheatley | 296/100.17 |
| 7,066,524 B2 * | 6/2006 | Schmeichel et al. | 296/100.16 |
| 7,150,490 B2 * | 12/2006 | Malmberg et al. | 296/100.15 |
| 7,484,790 B2 * | 2/2009 | Wheatley | 296/100.16 |
| RE41,078 E * | 1/2010 | Schmeichel | 296/100.15 |
| 7,954,876 B2 * | 6/2011 | Kosinski | 296/98 |
| 8,128,149 B1 * | 3/2012 | Wolf et al. | 296/100.16 |
| 8,714,622 B2 * | 5/2014 | Spencer et al. | 296/100.18 |
| 2002/0096268 A1 * | 7/2002 | Schmeichel et al. | 160/328 |
| 2012/0049568 A1 | 3/2012 | Wolf et al. | |

FOREIGN PATENT DOCUMENTS

| | | | |
|---|---|---|---|
| DE | 10307625 A1 * | 9/2004 | |
| WO | WO2014015574 | * | 1/2014 |
| WO | WO2014015574 A1 * | 1/2014 | |

OTHER PUBLICATIONS

English translation of written opinion for PCT/CN2012/084029 Feb. 11, 2012.*

* cited by examiner

COMPARTMENT COVER SYSTEM FOR COVERING COMPARTMENT OF PICKUP TRUCK

CROSS REFERENCE TO RELATED APPLICATIONS

The present application is a US National Stage of International Application No. PCT/CN2012/084029, filed Nov. 2, 2012, designating the United States, and claiming priority to Chinese Patent Application No. 2012102529491, filed with the State Intellectual Property Office of China on Jul. 21, 2012, and entitled "Compartment Cover System for Covering Compartment of Pickup Truck," which is hereby incorporated by reference in its entirety.

FIELD OF THE INVENTION

The present invention relates to a compartment cover system for covering a compartment of a pickup truck.

BACKGROUND OF THE INVENTION

The compartment of a pickup truck is open and thus has to be covered with a compartment cover to protect articles inside the compartment. An existing compartment cover system for covering the compartment of a pickup truck typically includes a covering layer for covering the compartment of the pickup truck with a front frame edge connected at the front end of the covering layer and a back frame edge connected at the back end of the covering layer, and also includes a driver-side frame edge and a passenger-side frame edge provided respectively at the top on both sides of the compartment of the pickup truck, where both ends of the front frame edge are fixed respectively at the head of the driver-side frame edge and the head of the passenger-side frame edge, and a fixing mechanism is provided at the tails of the driver-side frame edge and the passenger-side frame edge. In use the back frame edge is pulled backward so that the covering layer covers the compartment and then both the ends of the front frame edge is fixed on the fixing mechanism. The fixing mechanism is typically structured so that a buckle base is provided respectively at the tails of the driver-side frame edge and the passenger-side frame edge, where the buckle base include a buckle which is provided with a opening faced backward and into which a buckle tongue provided on the back frame edge is engaged. A drawback of the existing compartment cover system for covering the compartment of a pickup truck lies in that the tongue engaged into the buckle in the fore-and-aft direction is weakly fixed so that the covering layer may easily be lifted off.

SUMMARY OF THE INVENTION

In order to address the foregoing drawback of the existing compartment cover system for covering the compartment of a pickup truck, the invention provides a compartment cover system for covering the compartment of a pickup truck which can be firmly fixed in use.

A technical solution of the invention to address the technical problem thereof is a compartment cover system for covering the compartment of a pickup truck, including a covering layer for covering the compartment of a pickup truck with a front frame edge connected at the front end and a back frame edge connected at the back end of the covering layer, and further including a driver-side frame edge and a passenger-side frame edge provided respectively at the top on both sides of the compartment of the pickup truck, wherein both ends of the front frame edge are fixed respectively at the head of the driver-side flame edge and the head of the passenger-side frame edge:

A driver-side buckle provided at the tail of the driver-side frame edge includes a driver-side slot with an opening facing inward, and a passenger-side buckle provided at the tail of the passenger-side frame edge includes a passenger-side slot with an opening facing inward;

A driver-side lock casing provided on the driver-side end of the back frame edge includes a driver-side lock tongue cavity with a driver-side lock tongue opening facing outward; a driver-side lock tongue provided inside the driver-side lock tongue cavity is provided at the tail with a driver-side pulling rod section passing backward through the driver-side lock casing; and a driver-side compression spring provided surrounding the driver-side pulling rod section inside the driver-side lock tongue cavity is pushed on one end against the driver-side lock tongue and on the other end against the tip of the driver-side lock tongue cavity so that the driver-side lock tongue can protrude outside of the driver-side lock tongue opening and thus the driver-side lock tongue opening can further be locked into the driver-side slot;

A passenger-side lock casing provided on the passenger-side end of the back frame edge includes a passenger-side lock tongue cavity with a passenger-side lock tongue opening facing outward; a passenger-side lock tongue provided inside the passenger-side lock tongue cavity is provided at the tail with a passenger-side pulling rod section passing backward through the passenger-side lock casing; and a passenger-side compression spring provided surrounding the passenger-side pulling rod section inside the passenger-side lock tongue cavity is pushed on one end against the passenger-side lock tongue and on the other end against the tip of the passenger-side lock tongue cavity so that the passenger-side lock tongue can protrude outside of the passenger-side lock tongue opening and thus the passenger-side lock tongue opening can further be locked into the passenger-side slot; and The driver-side pulling rod section and the passenger-side pulling rod section are connected through a pulling cord.

Further, a driver-side thread is provided on the driver-side pulling rod section on which a driver-side adjustment nut located outside of the driver-side lock casing is screwed, and a passenger-side thread is provided inn the passenger-side pulling rod section on which a passenger-side adjustment nut located outside of the passenger-side lock casing is screwed.

Further, a notch provided on the back of the back frame edge, and both the driver-side lock casing and the passenger-side lock casing are provided in the notch.

Further, both the driver-side lock casing and the passenger-side lock casing are positioned in the notch through lock casing bolts.

Further, the notch is further provided therein with two pulling cord positioning racks through the pulling cord passes.

The invention further has the following additional technical features.

A driver-side buckle tongue extends forward from the driver-side end of the back frame edge, and a passenger-side buckle tongue extends forward from the passenger-side end of the back frame edge;

A driver-side buckle base provided at the tail of the driver-side frame edge is located in front of the driver-side buckle and provided with a driver-side slot which is provided with an opening facing backward and into which the driver-side buckle tongue can be engaged; and A passenger-side buckle base provided at the tail of the passenger-side frame edge is located in front of the passenger-side buckle and provided with a passenger-side slot which is provided with an opening facing backward and into which the passenger-side buckle tongue can be engaged.

Furthermore the driver-side buckle base is provided movably at the tail of the driver-side frame edge, and the passenger-side buckle base is provided movably at the tail of the passenger-side frame edge.

A driver-side buckle base fixing hole is provided at the tail of the driver-side frame edge, a driver-side nut hole corresponding to the driver-side buckle base fixing hole is provided on the driver-side buckle base, and a driver-side fixing nut is screwed in the driver-side nut hole; and there are further provided a driver-side buckle base locking bolt and a driver-side pad, the driver-side pad has a larger diameter than the length and the width of the driver-side buckle base fixing hole and rests on the bottom surface of the driver-side frame edge at the driver-side buckle base fixing hole, and the driver-side buckle base locking bolt passes through the driver-side pad and the driver-side buckle base fixing hole and then is threaded into the driver-side fixing nut to lock the driver-side buckle base; and A passenger-side buckle base fixing hole is provided at the tail of the passenger-side frame edge, a passenger-side nut hole corresponding to the passenger-side buckle base fixing hole is provided on the passenger-side buckle base, and a passenger-side fixing nut is screwed in the passenger-side nut hole; and there are further provided a passenger-side buckle base locking bolt and a passenger-side pad, the passenger-side pad has a larger diameter than the length and the width of the passenger-side buckle base fixing hole and eats on the bottom surface of the passenger-side frame edge at the passenger-side buckle base fixing hole, and the passenger-side buckle base locking bolt passes through the passenger-side pad and the passenger-side buckle base fixing hole and then is threaded into the passenger-side fixing nut to lock the passenger-side buckle base.

Furthermore a plurality of driver-side positioning holes are further provided on the driver-side frame edge, and a driver-side positioning block corresponding to the driver-side positioning holes is provided on the driver-side buckle base and the driver-side positioning block is selectively inserted into one of the driver-side positioning holes; and a plurality of passenger-side positioning holes are further provided on the passenger-side frame edge, and a passenger-side positioning block corresponding to the passenger-side positioning holes is provided on the passenger-side buckle base and the passenger-side positioning block is selectively inserted into one of the passenger-side positioning holes.

In use of the invention, the back frame edge is pulled backward on that the covering layer covers the compartment, the driver-side lock tongue on the back frame edge corresponds to the driver-side buckle and the passenger-side lock tongue corresponds to the passenger-side buckle as the case of the existing compartment cover system for covering the compartment of a pickup truck. Then the back frame edge is pressed downward, and in the meantime, the driver-side lock tongue resists the spring force of the driver-side compression spring and the passenger-side lock tongue resists the spring force of the passenger-side compression spring so that the driver-side lock tongue retracts into the driver-side lock casing and the passenger-side lock tongue retracts into the passenger-side lock casing until the driver-side lock tongue goes across the driver-side buckle and the passenger-side lock tongue goes across the passenger-side buckle. At the time, the driver-side lock tongue is ejected outward under the action of the driver-side compression spring and locked into the driver-side slot, and the passenger-side lock tongue is ejected outward under the action of the passenger-side compression spring and locked into the passenger-side slot. For unlocking, the pulling cord is pulled upward to pull the driver-side lock tongue and the passenger-side lock tongue inward so that the driver-side lock tongue is disengaged from the driver-side slot and the passenger-side lock tongue is disengaged from the passenger-side slot so as to be unlocked.

With the driver-side buckle base and the passenger-side buckle base provided, firstly the driver-side buckle tongue is inserted into the driver-side slot and the passenger-side buckle tongue is inserted into the passenger-side slot, and then the driver-side lock tongue and the passenger-side lock tongue are engaged therein.

An advantageous effect of the invention lies in that the driver-side lock tongue and the passenger-side lock tongue are locked transversely, thus resulting in firmer fixing and operation convenience.

DETAILED DESCRIPTION OF THE EMBODIMENTS

The invention will be further detailed below with reference to the drawings and embodiments thereof.

Figure 1:
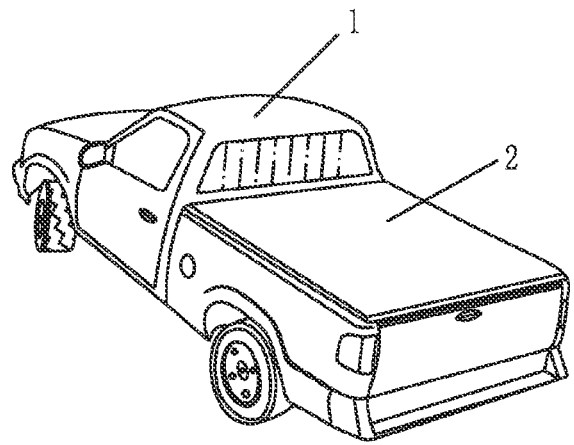
FIG. 1 is a schematic diagram of the invention applied to a pickup truck.
Figure 2:
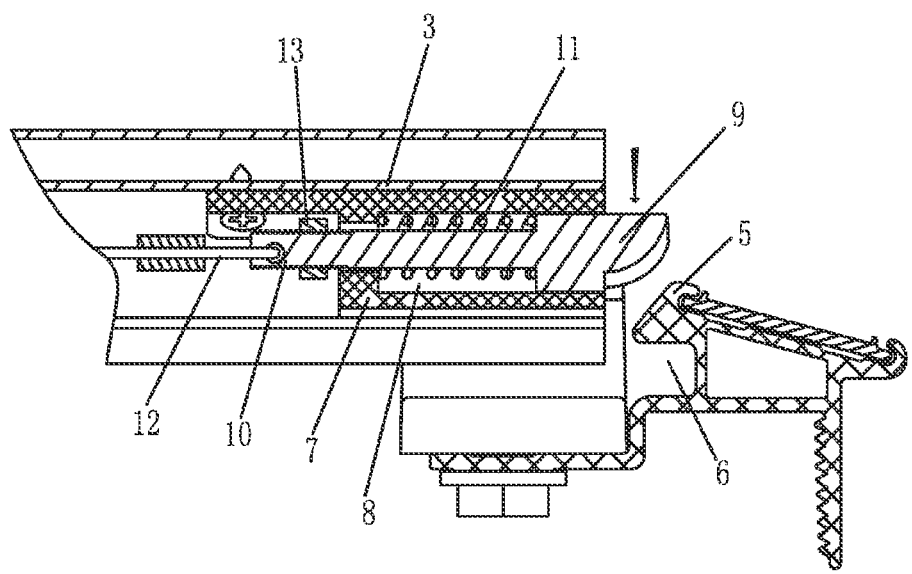
FIG. 2 is a sectional view of a passenger-side lock tongue prior to being locked, i.e., a longitudinal sectional view along a back frame edge.
Figure 3:
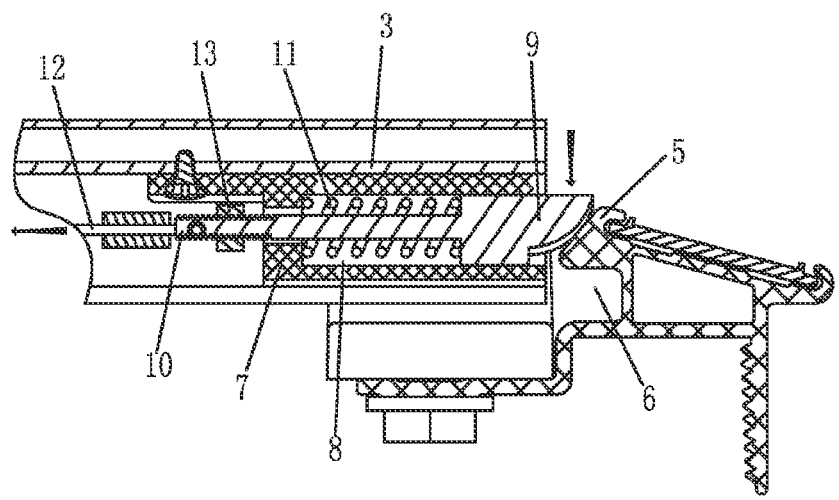
FIG. 3 is a sectional view of the passenger-side lock tongue being locked.
Figure 4:
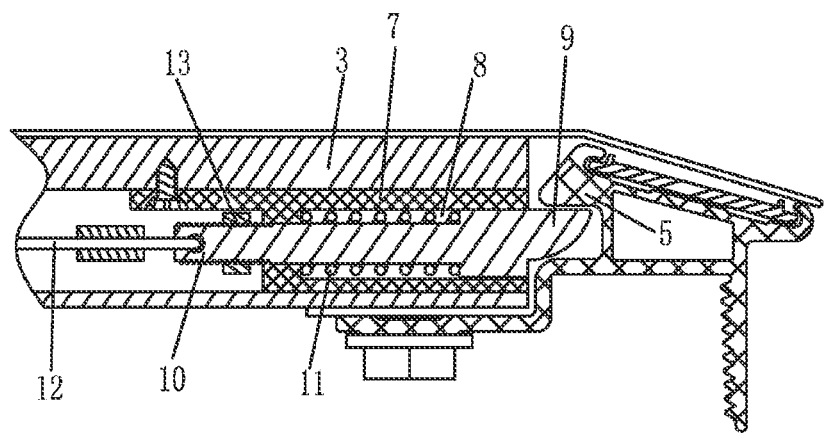
FIG. 4 is a sectional view of the passenger-side lock tongue after being locked.
Figure 5:
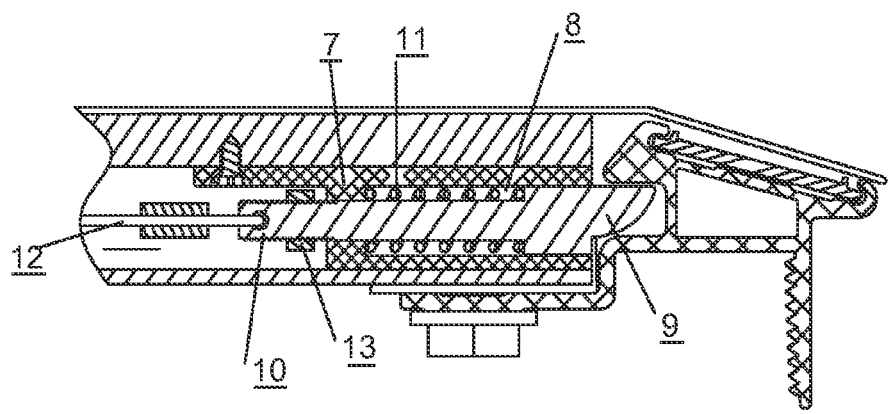
FIG. 5 is a schematic diagram of the status where the passenger-side lock tongue starts to be unlocked.
Figure 6:
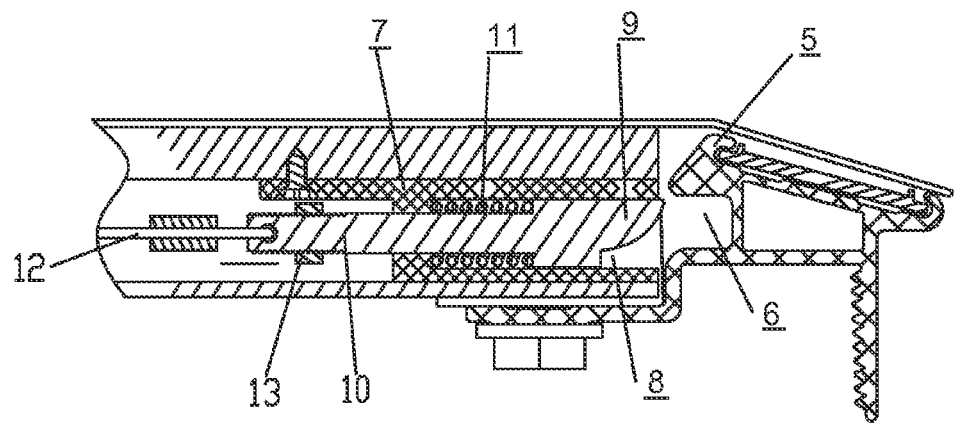
FIG. 6 is a schematic diagram of the status where the passenger-side lock tongue is being unlocked.
Figure 7:
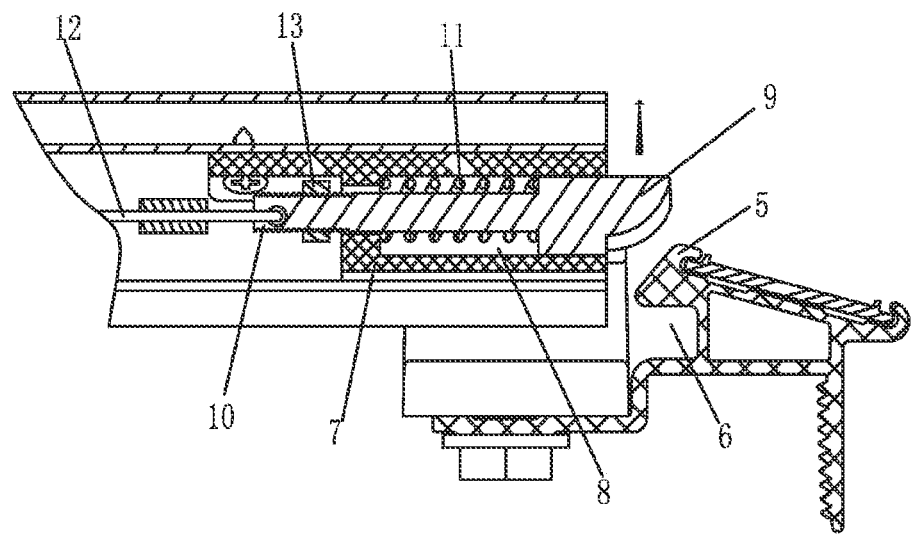
FIG. 7 is a schematic diagram of the status where the passenger-side lock tongue has been unlocked.
Figure 8:
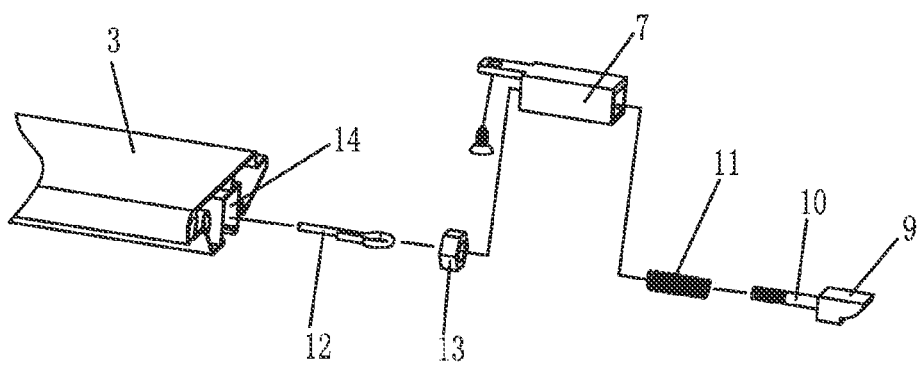
FIG. 8 is an explosive view of installation of the passenger-side lock tongue.
Figure 9:
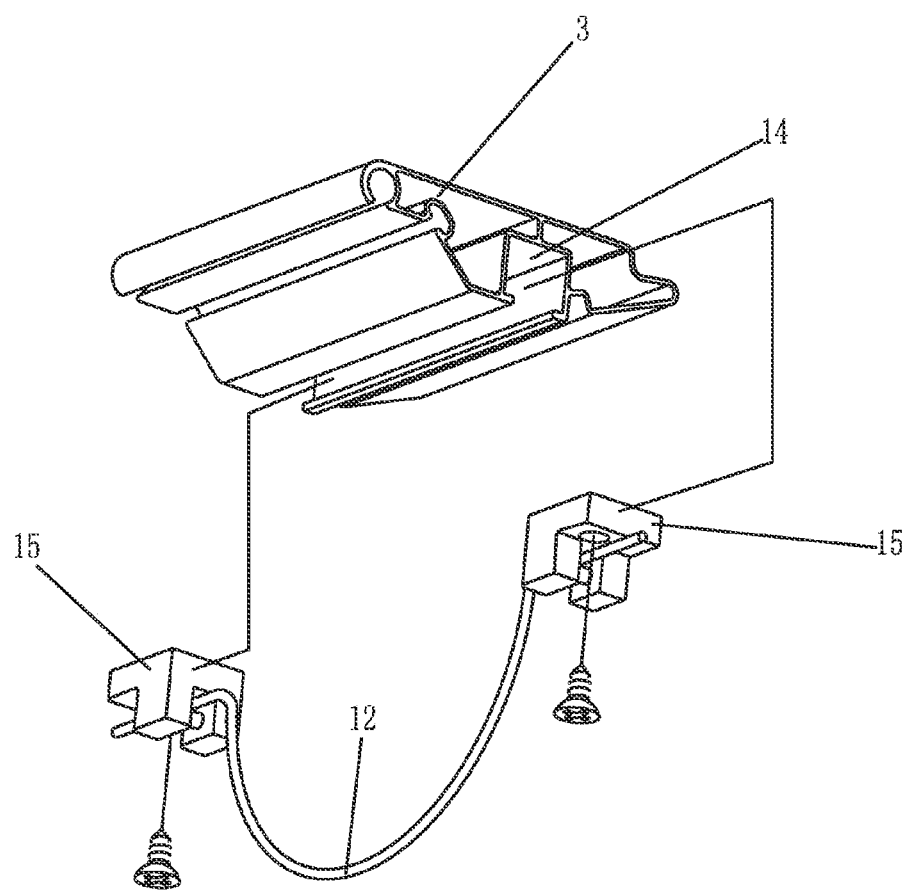
FIG. 9 is a schematic diagram of installation of a pulling cord.

Referring to FIG. 1 to FIG. 9, a compartment cover system for covering the compartment of a pickup truck includes a covering layer 2 for covering the compartment of a pickup truck 1 with a front frame edge connected at the front end of the covering layer 2 and a back frame edge 3 connected at the back end of the covering layer 2.

There are also included a driver-side frame edge and a passenger-side frame edge 4 provided respectively at the upper ends on both sides of the compartment of the pickup truck, where both ends of the front frame edge are fixed respectively at the head of the driver-side frame edge and the head of the passenger-side frame edge 4.

A driver-side buckle provided at the tail of the passenger-side frame edge includes a driver-side slot with an opening facing inward, and a passenger-side buckle 5 provided at the tail of the passenger-side frame edge 4 includes a passenger-side slot 6 with an opening facing inward.

A driver-side lock casing provided on the driver-side end of the back frame edge includes a driver-side lock tongue cavity with a driver-side lock tongue opening facing outward; a driver-side lock tongue provided inside the driver-side lock tongue cavity is provided at the tail with a driver-side pulling rod section passing backward through the driver-side lock casing; and a driver-side compression spring provided surrounding the driver-side pulling rod section inside the driver-side lock tongue cavity is pushed on one end against the driver-side lock tongue and on the other end against the tip of the driver-side lock tongue cavity so that the driver-side lock tongue can protrude beyond the driver-side lock tongue opening so that the driver-side lock tongue opening can further be locked into the driver-side slot.

A passenger-side lock casing 7 provided on the passenger-side end of the back flame edge 3 includes a passenger-side lock tongue cavity 8 with a passenger-side lock tongue opening facing outward; a passenger-side lock tongue 9 provided inside the passenger-side lock tongue cavity is provided at the tail with a passenger-side pulling rod section 10 passing backward through the passenger-side lock casing 7; and a passenger-side compression spring 11 provided surrounding on the passenger-side pulling rod section 10 inside the passenger-side lock tongue cavity 8 is pushed on one end against the passenger-side lock tongue 9 and on the other end against the tip of the passenger-side lock tongue cavity 8 so that the passenger-side lock tongue 9 can protrude beyond the passenger-side lock tongue opening so that the passenger-side lock tongue opening can further be locked into the passenger-side slot 6.

The driver-side pulling rod section and the passenger-side pulling rod section 10 are connected through a pulling cord 12.

In use the back frame edge 3 is pulled backward so that the covering layer 2 covers the compartment, the driver-side lock tongue on the back frame edge 3 corresponds to the driver-side buckle and the passenger-side lock tongue 9 corresponds to the passenger-side buckle 5, as the case of the existing compartment cover system for covering the compartment of a pickup truck. Then the back frame edge 3 is pressed downward, and in the meantime, the driver-side lock tongue resists the spring force of the driver-side compression spring and the passenger-side lock tongue 9 resists the spring force of the passenger-side compression spring 11 so that the driver-side lock tongue retracts into the driver-side lock casing and the passenger-side lock tongue 9 retracts into the passenger-side lock casing 7 until the driver-side lock tongue goes across the driver-side buckle and the passenger-side lock tongue 9 goes across the passenger-side buckle 5. At that time, the driver-side lock tongue is ejected outward under the action of the driver-side compression spring and tightly locked into the driver-side slot, and the passenger-side lock tongue 9 is ejected outward under the action of the passenger-side compression spring 11 and tightly locked into the passenger-side slot 6. For unlocking, the pulling cord 12 is pulled upward to pull inward the driver-side lock tongue and the passenger-side lock tongue 9 so that the diver-side lock tongue is disengaged from the driver-side slot and the passenger-side lock tongue 9 is disengaged from the passenger-side slot 6 so as to be unlocked.

In this embodiment, a driver-side thread is provided on the driver-side pulling rod section on which a driver-side adjustment nut located outside of the driver-side lock casing is screwed, and a passenger-side thread is provided on the passenger-side pulling rod section 10 on which a passenger-side adjustment nut 13 located outside of the passenger-side lock casing 7 is screwed. The extent that the driver-side lock tongue and the passenger-side lock tongue 9 protrude can be adjusted by adjusting the driver-side adjustment nut and the passenger-side adjustment nut 13.

In this embodiment, a notch 14 provided on the back of the back frame edge 3 has both the driver-side lock casing and the passenger-side lock casing 7 provided therein. Both the driver-side lock casing and the passenger-side lock casing 7 can be positioned in the notch 14 through lock casing bolts. The notch 14 is further provided therein with two pulling cord positioning racks 15 through the pulling cord 12 passes so as to be prevented from easily sliding.

Figure 10:
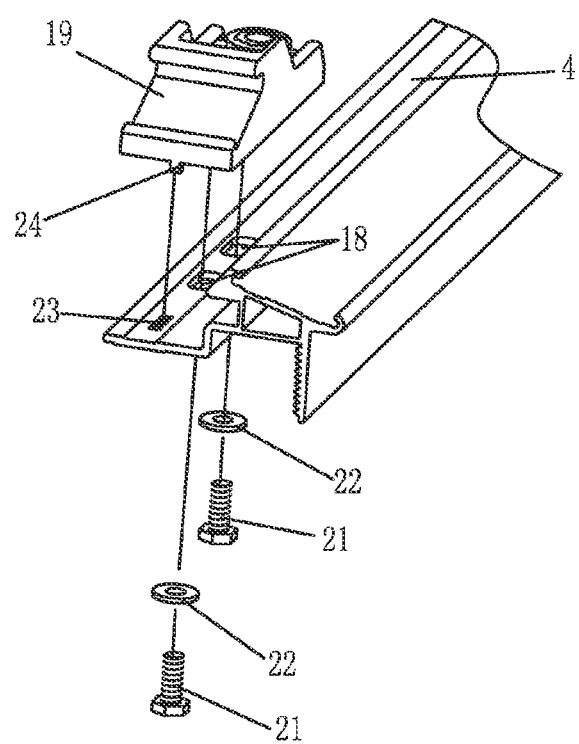
FIG. 10 is an explosive view of installation of a passenger-side buckle base.
Figure 11:
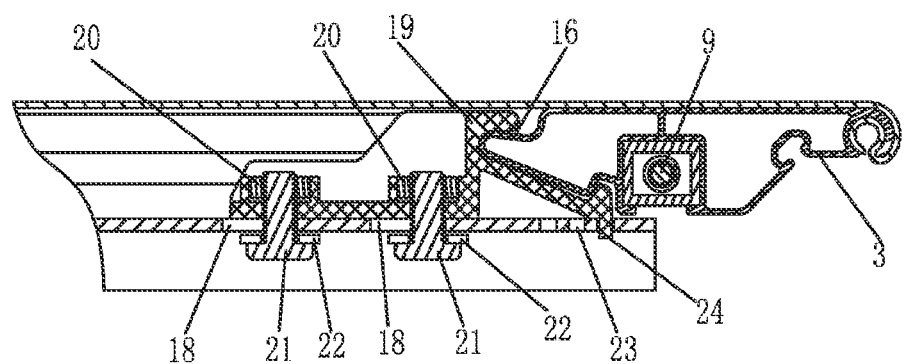
FIG. 11 is a sectional view of the passenger-side buckle base installed at the backmost end, i.e., a cross sectional view along the back frame edge.
Figure 12:
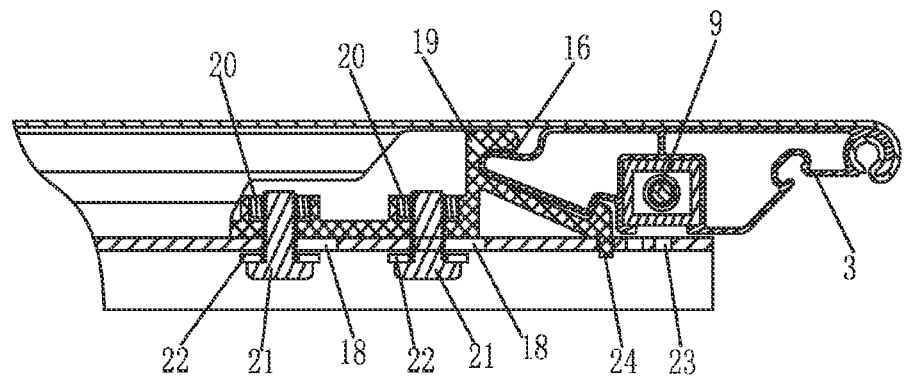
FIG. 12 is a sectional view of the passenger-side buckle base installed at the foremost end.
Figure 13:
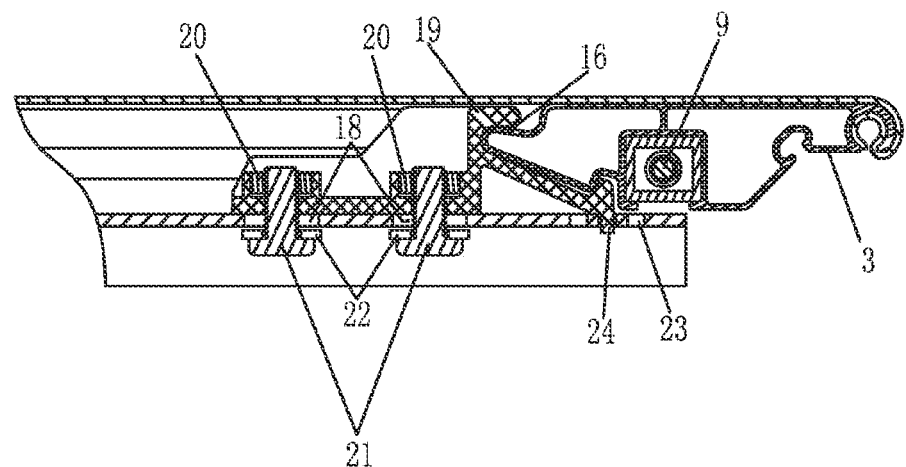
FIG. 13 is a sectional view of the passenger-side buckle base installed at the middle.
Figure 14:
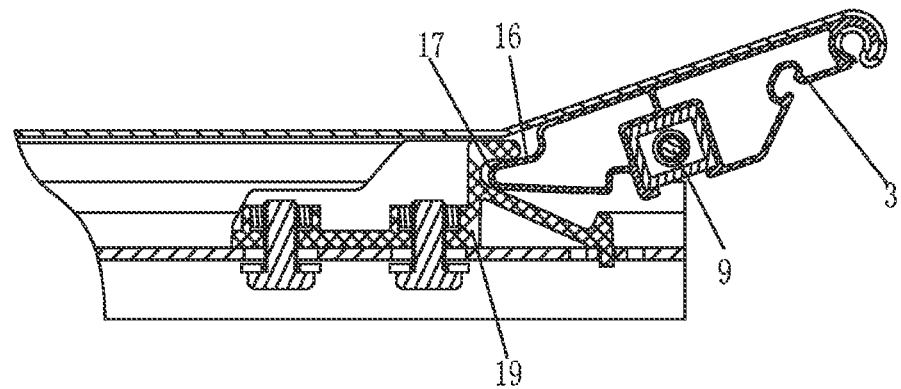
FIG. 14 is a schematic diagram of the status where a passenger-side buckle tongue is being engaged into the passenger-side buckle base.
Figure 15:
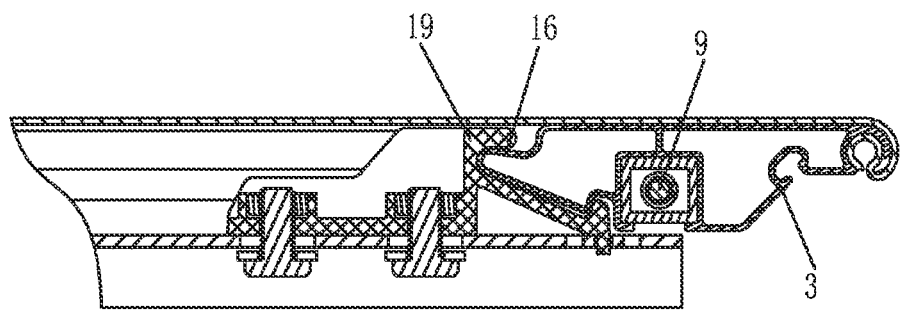
FIG. 15 is a schematic diagram of the status after the passenger-side buckle tongue has been engaged into the passenger-side buckle base.

Referring to FIG. 10 to FIG. 15, in this embodiment, a driver-side buckle tongue extends forward from the drive side end of the back frame edge 3, and a passenger-side buckle tongue 16 extends forward from the passenger-side end of the back frame edge.

A driver-side buckle base provided at the tail of the driver-side frame edge is located in front of the driver-side buckle and provided with a driver-side slot which is provided with an opening facing backward and into which the driver-side buckle tongue can be engaged.

A passenger-side buckle base 19 provided at the tail of the passenger-side frame edge 4 is located in front of the passenger-side buckle 5 and provided with a passenger-side slot 17 Which is provided with an opening facing backward and into which the passenger-side buckle tongue 16 can be engaged.

In this embodiment, the driver-side buckle base is provided movably at the tail of the driver-side frame edge, and the passenger-side buckle base 19 is provided movably at the tail of the passenger-side frame edge 4. They are connected particularly in such a way that a driver-side buckle base fixing hole is provided at the tail of the driver-side frame edge, a driver-side nut hole corresponding to the driver-side buckle base fixing hole is provided on the driver-side buckle base, and a driver-side fixing nut is screwed in the driver-side nut hole; and there are further provided a driver-side buckle base locking bolt and a driver-side pad, the driver-side pad has a larger diameter than the length and the width of the driver-side buckle base fixing hole and rests on the bottom surface of the driver-side frame edge at the driver-side buckle base fixing hole, and the driver-side buckle base locking bolt passes through the driver-side pad and the driver-side buckle base fixing hole and then is threaded into the driver-side fixing nut to lock the driver-side buckle base; and the screw of the driver-side buckle base locking bolt is movable inside the driver-side buckle base fixing hole to move the driver-side buckle base and the driver-side pad so that the driver-side buckle base locking bolt can be locked at different locations to thereby have the driver-side buckle base to be positioned at the different locations in the fore-and-aft direction.

A passenger-side buckle base fixing hole 18 is provided at the tail of the passenger-side frame edge 4, a passenger-side nut hole corresponding to the passenger-side buckle base fixing hole 18 is provided on the passenger-side buckle base 19, and a passenger-side fixing nut 20 is screwed in the passenger-side nut hole; and there are further provided a passenger-side buckle base locking bolt 21 and a passenger-side pad 22, the passenger-side pad 22 has a larger diameter than the length and the width of the passenger-side buckle base fixing hole 18 and rests on the bottom surface of the passenger-side frame edge at the passenger-side buckle base fixing hole, and the passenger-side buckle base locking bolt 21 passes through the passenger-side pad 22 and the passenger-side buckle base fixing hole 18 and then is threaded into the passenger-side fixing nut 20 to lock the passenger-side buckle base 19; and the screw of the passenger-side buckle base locking bolt 21 is movable inside the passenger-side buckle base fixing hole 18 to move the passenger-side buckle base 19 and the passenger-side pad 22 so that the passenger-side buckle base locking bolt 21 can be locked at different locations to thereby have the passenger-side buckle base 19 positioned at the different locations in the fore-and-aft direction.

In this embodiment, a plurality of driver-side positioning holes are further provided on the driver-side frame edge, and a driver-side positioning block corresponding to the driver-side positioning holes is provided on the driver-side buckle base and the driver-side positioning block is selectively inserted into one of the driver-side positioning holes; and a plurality of passenger-side positioning holes 23 are further provided on the passenger-side frame edge 4, and a passenger-side positioning block 24 corresponding to the passenger-side positioning holes 23 is provided on the passenger-side buckle base 19 and the passenger-side positioning block 24 is selectively inserted into one of the passenger-side positioning holes 23. Thus the driver-side buckle base and the passenger-side buckle base 19 can be positioned more firmly.

With the driver-side buckle base and the passenger-side buckle base 19 provided, firstly the driver-side buckle tongue is inserted into the driver-side slot and the passenger-side buckle tongue 16 is inserted into the passenger-side slot 17, and then the driver-side lock tongue and the passenger-side lock tongue 9 are engaged therein, thus positioning the cover of the compartment more firmly. Furthermore the covering layer of the compartment cover is typically made of leather and may flex in different use environments, and the driver-side buckle base and the passenger-side buckle base 19 can be positioned at different locations in the fore-and-aft direction. When closing the cover of the compartment, firstly the driver-side buckle tongue is inserted into the driver-side slot and then the passenger-side buckle tongue 16 is inserted the passenger-side slot 17, thereby ensuring substantial flatness of the covering layer, prevent slouchiness thereof, etc.

The invention claimed is:

1. A compartment cover system for covering a compartment of a pickup truck, comprising a covering layer for covering the compartment of the pickup truck with a front frame edge connected at the front end of the covering layer and a back frame edge connected at the back end of the covering layer, and the compartment cover system further comprising a driver-side frame edge and a passenger-side frame edge provided respectively at the top on both sides of the compartment of the pickup truck, wherein both ends of the front frame edge are fixed respectively at the head of the driver-side frame edge and the head of the passenger-side frame edge, characterized in that:

a driver-side buckle provided at the tail of the driver-side frame edge comprises a driver-side slot with an opening facing inward, and a passenger-side buckle provided at the tail of the passenger-side frame edge comprises a passenger-side slot with an opening facing inward, wherein the opening of the driver-side slot is defined by a top portion and a bottom portion of the driver-side buckle, and wherein the opening of the passenger-side slot is defined by a top portion and a bottom portion of the passenger-side buckle;

a driver-side lock casing provided on the driver-side end of the back frame edge comprises a driver-side lock tongue cavity with a driver-side lock tongue opening facing outward; a driver-side lock tongue provided inside the driver-side lock tongue cavity is provided at the tail with a driver-side pulling rod section passing backward through the driver-side lock casing; and a driver-side compression spring provided surrounding the driver-side pulling rod section inside the driver-side lock tongue cavity is pushed on one end against the driver-side lock tongue and on the other end against the tip of the driver-side lock tongue cavity so that the driver-side lock tongue can protrude outside of the driver-side lock tongue opening and thus the driver-side lock tongue opening can further be locked into the driver-side slot;

a passenger-side lock casing provided on the passenger-side end of the back frame edge comprises a passenger-side lock tongue cavity with a passenger-side lock tongue opening facing outward; a passenger-side lock tongue provided inside the passenger-side lock tongue cavity is provided at the tail with a passenger-side pulling rod section passing backward through the passenger-side lock casing; and a passenger-side compression spring provided surrounding the passenger-side pulling rod section inside the passenger-side lock tongue cavity is pushed on one end against the passenger-side lock tongue and on the other end against the tip of the passenger-side lock tongue cavity so that the passenger-side lock tongue can protrude outside of the passenger-side lock tongue opening, and thus the passenger-side lock tongue opening can further be locked into the passenger-side slot; and the driver-side pulling rod section and the passenger-side pulling rod section are connected through a pulling cord.

2. The compartment cover system for covering the compartment of the pickup truck according to claim 1, characterized in that, a driver-side thread is provided on the driver-side pulling rod section on which a driver-side adjustment nut located outside of the driver-side lock casing is screwed, and a passenger-side thread is provided on the passenger-side pulling rod section on which a passenger-side adjustment nut located outside of the passenger-side lock casing is screwed.

3. The compartment cover system for covering the compartment of the pickup truck according to claim 1 or 2, characterized in that, a notch is provided on the back of the back frame edge, both the driver-side lock casing and the passenger-side lock casing are provided in the notch.

4. The compartment cover system for covering the compartment of the pickup truck according to claim 3, characterized in that, both the driver-side lock casing and the passenger-side lock casing are positioned in the notch through lock casing bolts.

5. The compartment cover system for covering the compartment of the pickup truck according to claim 3, characterized in that, the notch is further provided therein with two pulling cord positioning racks through the pulling cord passes.

6. The compartment cover system for covering the compartment of the pickup truck according to claim 1 or 2, characterized in that, a driver-side buckle tongue extends forward from the driver-side end of the back frame edge, and a passenger-side buckle tongue extends forward from the passenger-side end of the back frame edge;
- a driver-side buckle base provided at the tail of the driver-side frame edge is located in front of the driver-side buckle and provided with a driver-side slot which is provided with an opening facing backward and into which the driver-side buckle tongue can be engaged; and
- a passenger-side buckle base provided at the tail of the passenger-side frame edge is located in front of the passenger-side buckle and provided with a passenger-side slot which is provided with an opening facing backward and into which the passenger-side buckle tongue can be engaged.

7. The compartment cover system for covering the compartment of the pickup truck according to claim 6, characterized in that, the driver-side buckle base is provided movably at the tail of the driver-side frame edge, and the passenger-side buckle base is provided movably at the tail of the passenger-side frame edge.

8. The compartment cover system for covering the compartment of the pickup truck according to claim 7, characterized in that, a driver-side buckle base fixing hole is provided at the tail of the driver-side frame edge, a driver-side nut hole corresponding to the driver-side buckle base fixing hole is provided on the driver-side buckle base, and a driver-side fixing nut is screwed in the driver-side nut hole; and there are further provided a driver-side buckle base locking bolt and a driver-side pad, the driver-side pad has a larger diameter than the length and the width of the driver-side buckle base fixing hole and rests on the bottom surface of the driver-side frame edge at the driver-side buckle base fixing hole, and the driver-side buckle base locking bolt passes through the driver-side pad and the driver-side buckle base fixing hole and then is threaded into the driver-side fixing nut to lock the driver-side buckle base; and
- a passenger-side buckle base fixing hole is provided at the tail of the passenger-side frame edge, a passenger-side nut hole corresponding to the passenger-side buckle base fixing hole is provided on the passenger-side buckle base, and a passenger-side fixing nut is screwed in the passenger-side nut hole; and there are further provided a passenger-side buckle base locking bolt and a passenger-side pad, the passenger-side pad has a larger diameter than the length and the width of the passenger-side buckle base fixing hole and rests on the bottom surface of the passenger-side frame edge at the passenger-side buckle base fixing hole, and the passenger-side buckle base locking bolt passes through the passenger-side pad and the passenger-side buckle base fixing hole and then is threaded into the passenger-side fixing nut to lock the passenger-side buckle base.

9. The compartment cover system for covering the compartment of the pickup truck according to claim 8, characterized in that, a plurality of driver-side positioning holes are further provided on the driver-side frame edge, and a driver-side positioning block corresponding to the driver-side positioning holes is provided on the driver-side buckle base and the driver-side positioning block is selectively inserted into one of the driver-side positioning holes; and a plurality of passenger-side positioning holes are further provided on the passenger-side frame edge, and a passenger-side positioning block corresponding to the passenger-side positioning holes is provided on the passenger-side buckle base and the driver-side positioning block is selectively inserted into one of the passenger-side positioning holes.

* * * * *